United States Patent [19]
McFarland et al.

[11] Patent Number: 5,625,164
[45] Date of Patent: Apr. 29, 1997

[54] AIR BAG INFLATOR

[75] Inventors: Eric R. McFarland, Mesa; Eric J. Champa, Gilbert, both of Ariz.

[73] Assignee: TRW Inc., Lyndhurst, Ohio

[21] Appl. No.: 532,893

[22] Filed: Sep. 22, 1995

[51] Int. Cl.$^6$ .................................................. C06D 5/00
[52] U.S. Cl. .................................................. 102/531; 280/741
[58] Field of Search .................................. 102/530, 531;
280/740, 741; 422/164–166; 267/141, 141.3, 141.6, 141.7, 161, 164

[56] References Cited

U.S. PATENT DOCUMENTS

| | | | |
|---|---|---|---|
| 2,726,081 | 12/1955 | Hunter | 267/141 |
| 3,986,456 | 10/1976 | Doin et al. | |
| 4,027,865 | 6/1977 | Greenwood et al. | 267/161 |
| 4,249,673 | 2/1981 | Katoh et al. | 102/530 |
| 4,358,998 | 11/1982 | Schneiter et al. | |
| 4,561,675 | 12/1985 | Adamo et al. | 280/741 |
| 4,590,041 | 5/1986 | Hill | 280/741 |
| 4,896,898 | 1/1990 | Lenzen et al. | |
| 5,189,255 | 2/1993 | Fukabori et al. | 102/531 |
| 5,346,254 | 9/1994 | Esterberg | 280/741 |
| 5,380,039 | 1/1995 | Emery et al. | |
| 5,382,415 | 1/1995 | Kishimoto et al. | |
| 5,387,008 | 2/1995 | Laruitzen et al. | |

FOREIGN PATENT DOCUMENTS

| | | | |
|---|---|---|---|
| 1027999 | 4/1958 | Germany | 67/161 |
| 539189 | 6/1975 | Russian Federation | 267/161 |

*Primary Examiner*—Harold J. Tudor
*Attorney, Agent, or Firm*—Tarolli, Sundheim, Covell, Tummino & Szabo

[57] ABSTRACT

In one embodiment, an air bag inflator (10) includes a canister (74) which has a lower canister section (76) and a canister cover (78). Disks (110) of gas generating material are located within a chamber (75) defined by the canister (74). A cushion (120) is located in the space between the uppermost disk (110U) and the canister cover (78). A wall (122) of the cushion (120) has a frustum shape prior to assembly of the inflator (10) and defines a cushion chamber (124). During assembly, the wall (122) of the cushion (120) is elastically bent into the cushion chamber (124). In another embodiment, an air bag inflator (160) includes a housing (176). Grains (212, 216) of gas generating material are located within a chamber (182) in the housing (176). A cushion (260) is located in a space between the last grain (216R) and the end cap (226). A wall (262) of the cushion (260) has a frustum shape prior to assembly of the inflator (160) and defines a cushion chamber (264). During assembly, the wall (262) of the cushion (260) is elastically bent into the cushion chamber (264). In both embodiments, the cushion (120 or 260) inhibits movement of the gas generating material with a force which is substantially constant and unrelated to the distance (D1 or D2) between the gas generating material (110U, 216R) and the canister cover (78) or end cap (226).

16 Claims, 7 Drawing Sheets

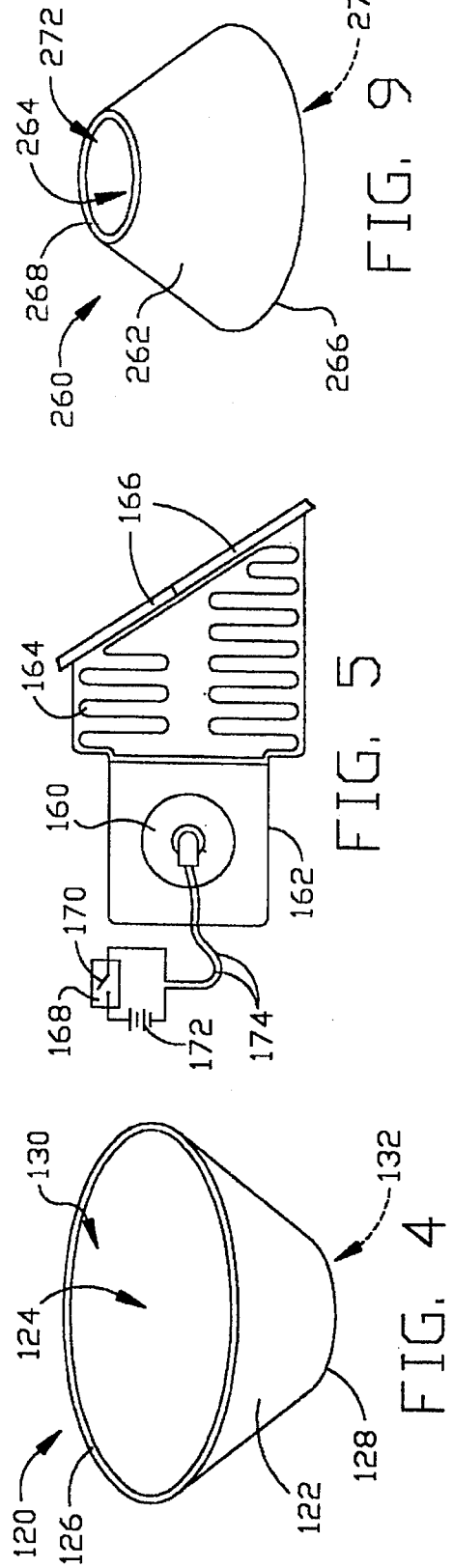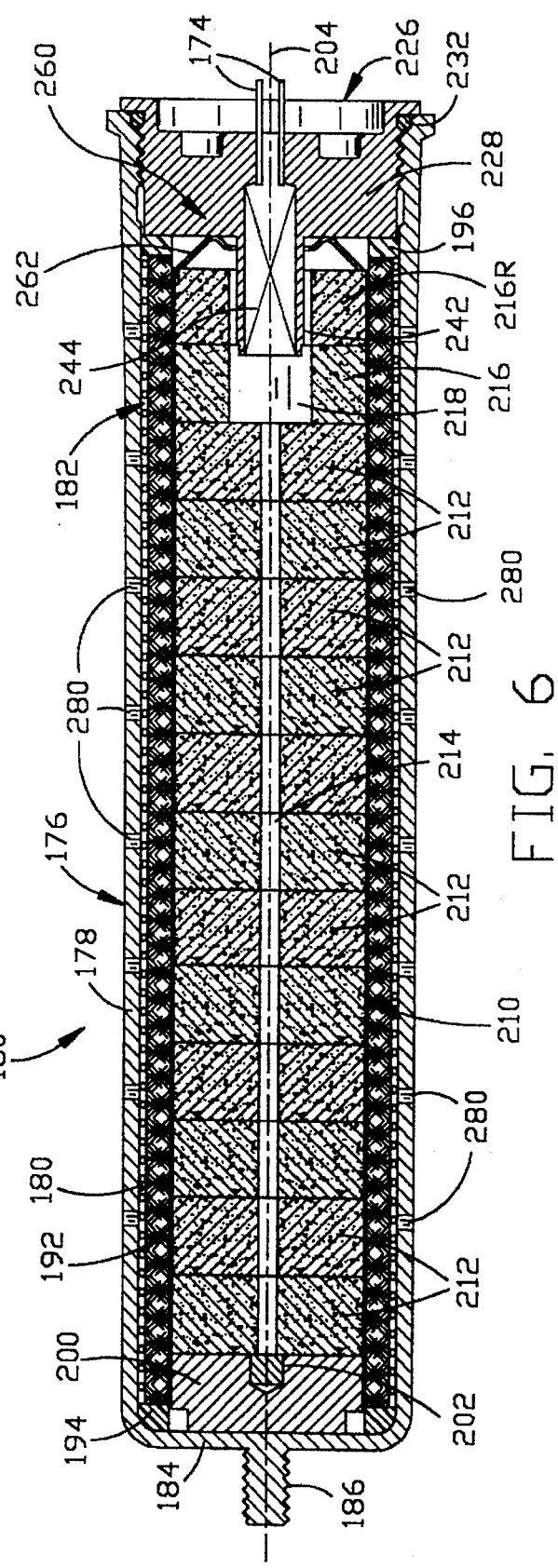

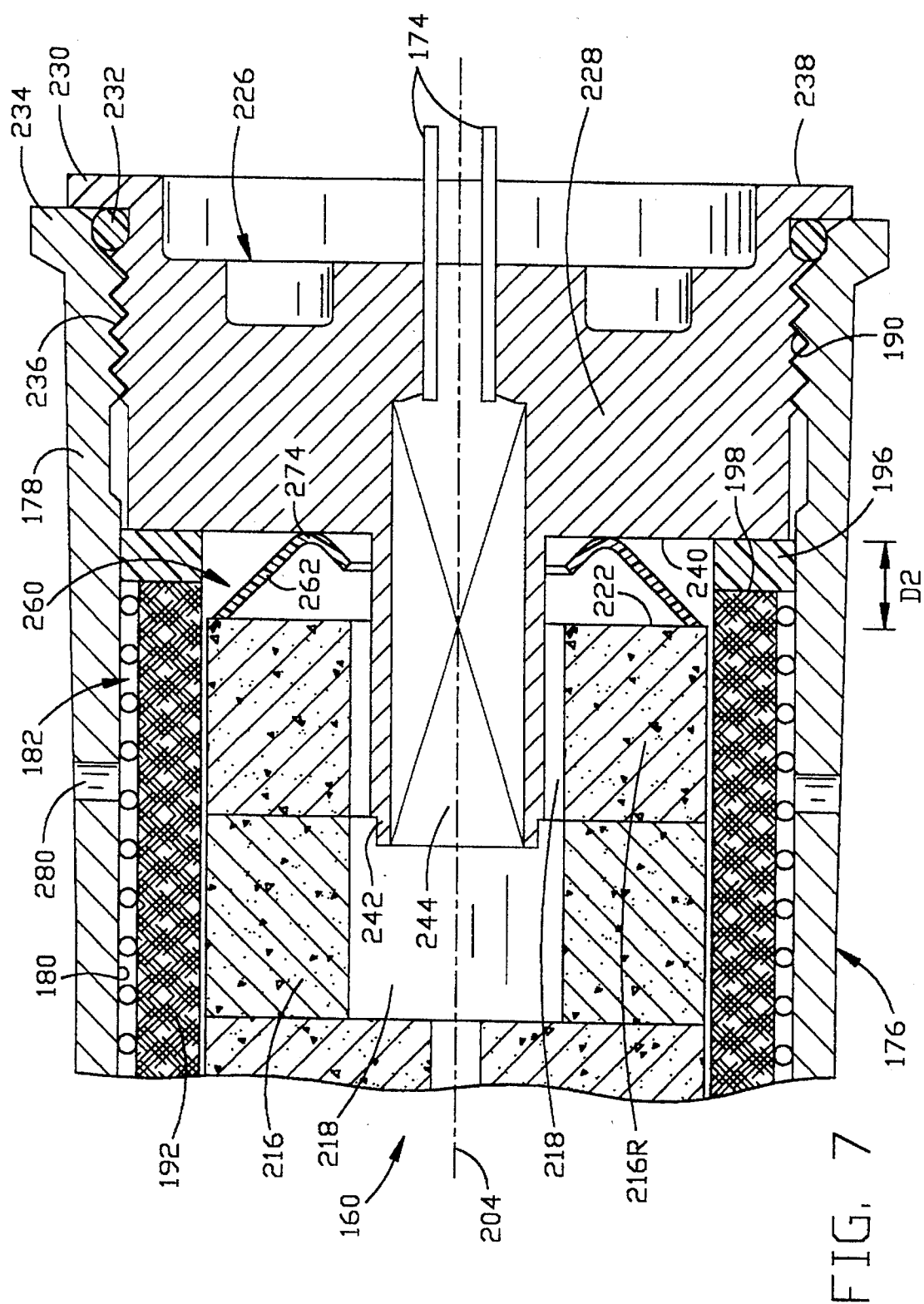

5,625,164

1

AIR BAG INFLATOR

BACKGROUND OF THE INVENTION

1. Technical Field

The present invention relates to an apparatus for inflating a vehicle occupant restraint such as an air bag. More particularly, the present invention relates to an air bag inflator having a member disposed within an enclosure for inhibiting movement of gas generating material in the enclosure.

2. Description of the Prior Art

In one known air bag inflator, a body of gas generating material is disposed within a hermetically sealed canister. An annular cushion is disposed between the body of gas generating material and a cover of the canister. The annular cushion is torus or doughnut shaped.

In another known air bag inflator, a body of gas generating material is disposed within a tubular cylindrical housing. An end cap is screwed into an open end of the housing to close the housing. A metal spring is disposed between the end cap and the gas generating material.

SUMMARY OF THE INVENTION

The present invention relates to an apparatus for providing inflation fluid for inflating a vehicle occupant restraint, such as an air bag. The apparatus includes an enclosure which has an end wall portion and which defines a chamber. Gas generating material is located within the chamber and is spaced a distance away from the end wall portion. A yieldable means located between the end wall portion and the gas generating material inhibits movement of the gas generating material relative to the enclosure with a force which is substantially constant and unrelated to the distance between the gas generating material and the end wall portion.

Preferably, the yieldable means comprises a member having a wall which has a frustum shape prior to location of the member between the end wall portion of the enclosure and the gas generating material. The wall encircles an axis of the member and tapers radially inward toward the axis along an extent of the wall. The wall defines a frustoconical-shaped chamber extending through the member. When the member is located between the end wall portion of the enclosure and the gas generating material, the wall is bent into the chamber of the member at an open end of the chamber in the member by force applied to the wall. A non-bent section of the wall is spaced away from the open end.

BRIEF DESCRIPTION OF THE DRAWINGS

Further features of the present invention will become apparent to those skilled in the art to which the present invention relates from reading the following specification with reference to the accompanying drawings, in which.

2

Figure 3:
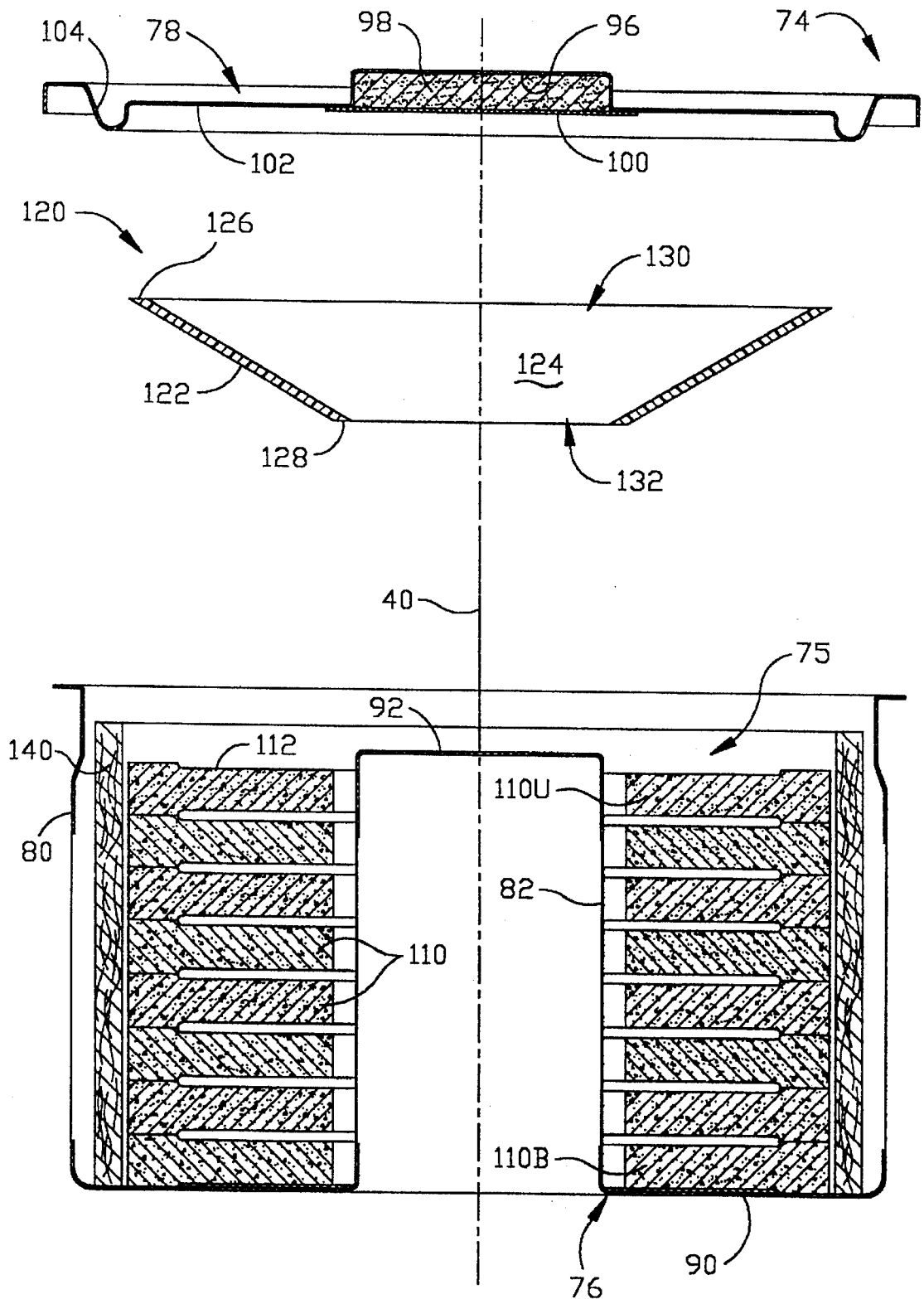
FIG. 3 is an exploded section view of a portion of the inflator illustrated in FIG. 2, and shows parts in a partially assembled condition.
Figure 8:
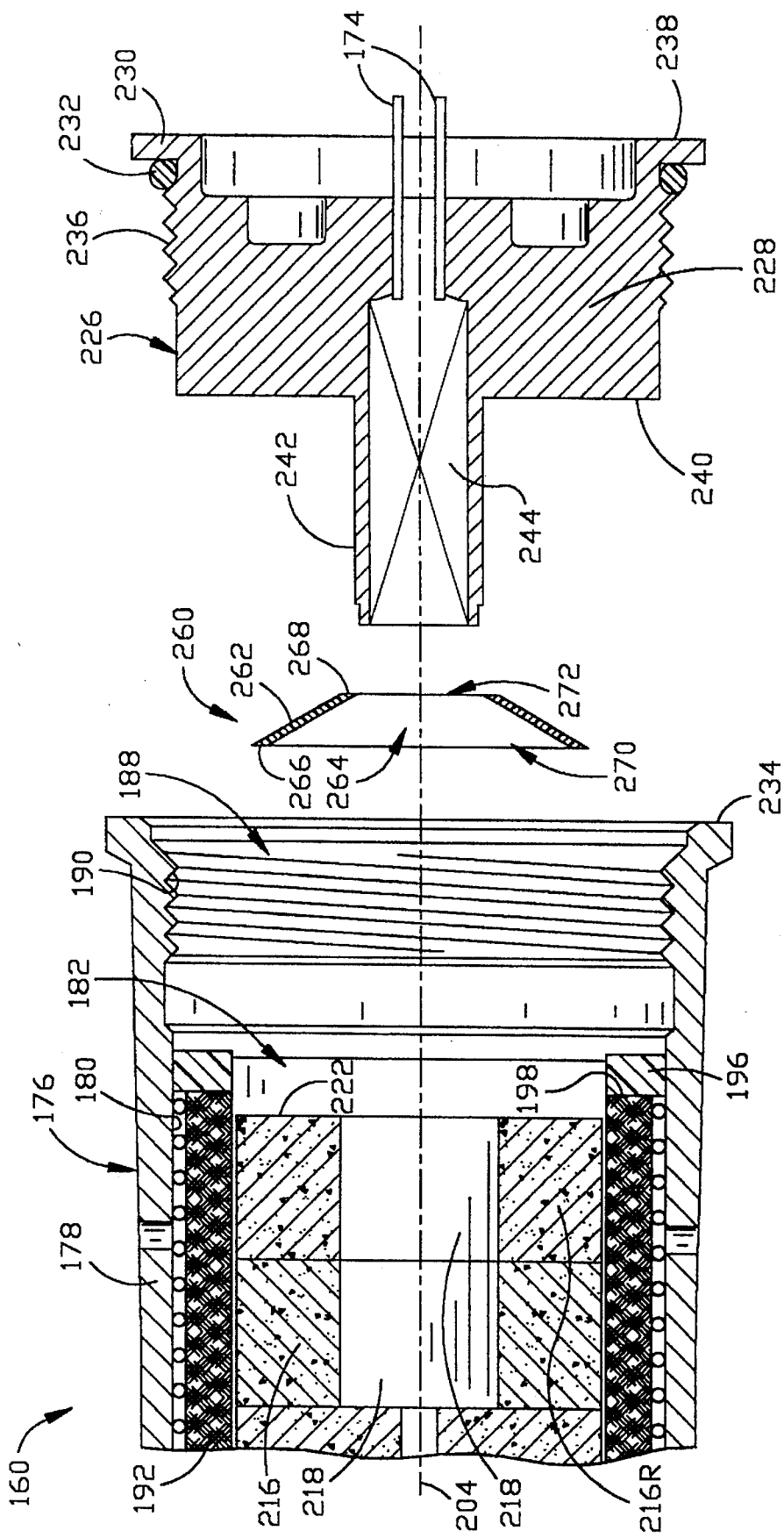

FIG. 4 is a perspective view of a part shown in FIG. 3;

FIG. 5 is a schematic representation of an inflatable occupant restraint module incorporating a second embodiment of the present invention and associated circuitry;

FIG. 6 is a transverse section view of an inflator in accordance with the second embodiment of the present invention in an assembled condition;

FIG. 7 is an enlarged view of a portion of the inflator illustrated in FIG. 6;

FIG. 8 is an exploded view of parts of the inflator illustrated in FIG. 6, and shows parts in a partially assembled condition;

FIG. 9 is a perspective view of a part shown in FIG. 6; and

Figure 10:
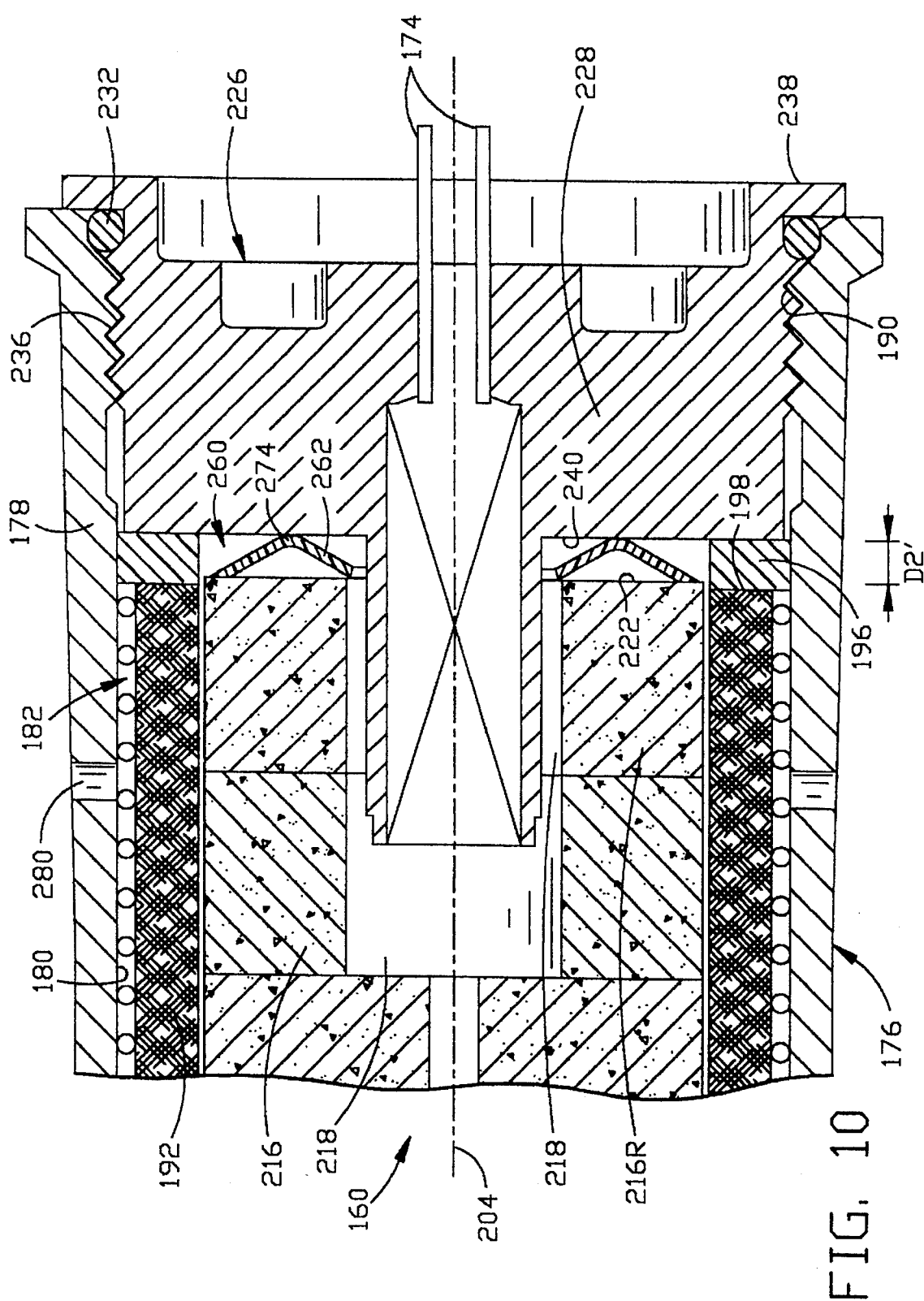

FIG. 10 is a view similar to FIG. 7 of an inflator with parts identical to the parts shown in FIG. 7.

DESCRIPTION OF PREFERRED EMBODIMENT

Figure 1:
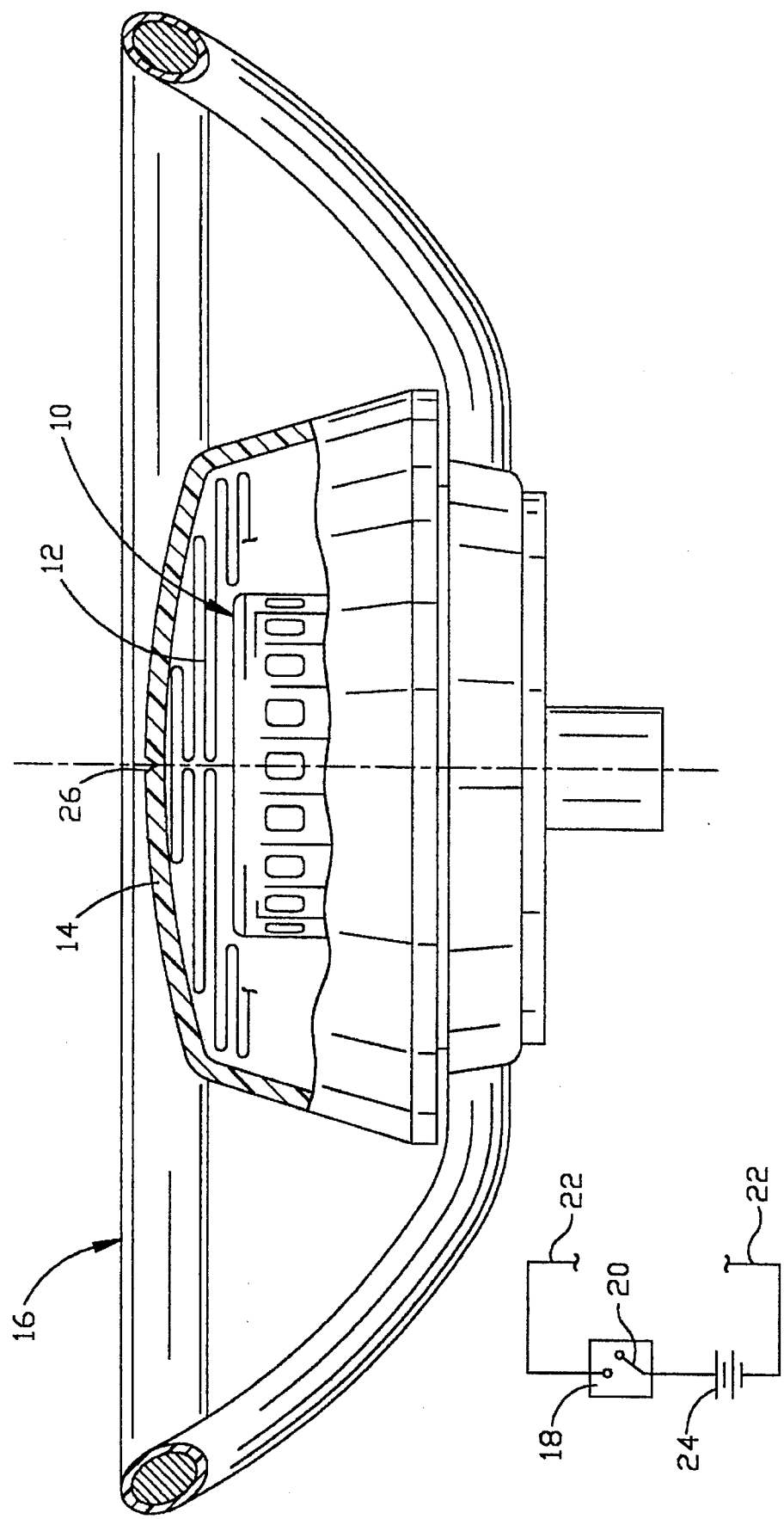
FIG. 1 is a transverse view, partially in section, of a vehicle steering wheel with an inflatable occupant restraint module incorporating an inflator constructed in accordance with the present invention, and a schematic representation of associated circuitry.

The present invention relates to an inflator for providing inflation fluid for inflating an air bag to help protect an occupant of a vehicle. As representative of the present invention, FIG. 1 illustrates an inflator 10. An air bag 12 is folded, adjacent the inflator 10. A cover 14 encloses the air bag 12 and the inflator 10. The inflator 10, the air bag 12, and the cover 14 form a module which is mounted on a vehicle steering wheel 16.

A sensor 18 (schematically shown) detects a condition indicative of a collision. Such a condition may be a sudden change in vehicle velocity, e.g., a sudden deceleration of the vehicle during the collision. The sensor 18 includes a switch 20 that closes in response to the detected condition so that an electrical energy signal flows along leads 22 between a power source 24 (e.g., the vehicle battery) and the inflator 10 to actuate the inflator. The inflator 10 supplies gas to the air bag 12 to inflate the air bag 12. The cover 14 has weakened portions 26 (only one shown) which break when pressure is applied to the cover through inflation of the air bag 12. As the air bag 12 inflates, it moves into the space between the driver of the vehicle and the steering wheel 16 to restrain movement of the driver in a suitable manner.

The inflator 10 (FIG. 2) includes a housing 30. The housing 30 is made of three parts, namely, a diffuser cup 32, a combustion cup 34, and a combustion chamber cover 36. The diffuser cup 32, the combustion cup 34, and the combustion chamber cover 36 are made of a metal, such as UNS S30100 stainless steel.

The diffuser cup 32 is generally cup-shaped and has a cylindrical side wall 38 extending around a central axis 40 of the inflator 10. The side wall 38 extends between a flat upper end wall 42 and a flat lower flange 44. The upper end wall 42 and the flange 44 are generally parallel to each other and perpendicular to the axis 40. An annular array of gas outlet openings 46 extends circumferentially around an upper portion of the diffuser cup side wall 38.

The combustion cup 34 is generally cup-shaped and is disposed inside the diffuser cup 32. The combustion cup 34 has a cylindrical side wall 50 extending around the axis 40. The cylindrical side wall 50 extends between a flat upper end wall 52 and a flat lower flange 54. The upper end wall 52 and the lower flange 54 are generally parallel to each other and perpendicular to the axis 40. An annular array of openings 56 extends circumferentially around a lower portion of the combustion cup side wall 50.

The upper end wall 52 of the combustion cup 34 is welded with a continuous weld to the upper end wall 42 of the diffuser cup 32 at a circumferential weld location 58, preferably by laser welding. The combustion cup flange 54 is welded with a continuous weld to the diffuser cup flange 44 at a circumferential weld location 60, also preferably by laser welding.

The combustion chamber cover 36 is a generally flat piece having a circular center portion 64 and a parallel but offset annular outer flange 66. A circular opening 68 is located in the center portion 64 of the chamber cover 36. The outer flange 66 of the chamber cover 36 is welded with a continuous weld to the combustion cup flange 54 at a circumferential weld location 70, again preferably by laser welding.

A hermetically sealed canister 74 is disposed in the combustion cup 34. The canister 74 is an enclosure which defines a chamber 75 and which is made of two parts, namely, a lower canister section 76 and a cover 78, that are preferably made of relatively thin aluminum. The lower canister section 76 has a cylindrical outer side wall 80 adjacent to and inside the combustion chamber side wall 50. The outer side wall 80 has a reduced thickness in the area adjacent the openings 56 in the combustion cup side wall 50. The lower canister section 76 also has a cylindrical inner side wall 82 spaced radially inward from the outer side wall 80. The inner side wall 82 has a reduced thickness in the area adjacent an igniter 88.

A flat ring-shaped lower wall 90 of the lower canister section 76 interconnects the outer side wall 80 and the inner side wall 82. A circular inner top wall 92 of the lower canister section 76 extends radially inward from and caps the inner side wall 82. The inner top wall 92 and the cylindrical inner side wall 82 define a downwardly open central recess 94 in the canister 74.

The canister cover 78 is generally circular in shape. A recess 96 is located in the center of the canister cover 78. A packet 98 of auto ignition material is located in the recess 96 and is held in the recess 96 by a piece of aluminum foil tape 100. The canister cover 78 has a flat wall portion 102 which is perpendicular to the axis 40 and which extends around the recess 96 radially within an outer rim 104. The radially outer edge of the rim 104 is crimped to an adjacent edge of the lower canister section 76 to seal the chamber 75 of the canister 74 hermetically.

A plurality of annular disks 110 of gas generating material are stacked atop each other within the chamber 75 of the canister 74. The bottom disk 110B of the stack is in engagement with the lower wall 90 of the lower canister section 76. The uppermost disk 110U of the stack has an upper surface 112 which is spaced a distance D1 from the wall portion 102. The disks 110 are made of a suitable material which when ignited generates nitrogen gas.

An annular cushion 120 is disposed within the chamber 75 in the space between the upper surface 112 of the uppermost disk 110U and the wall portion 102 of the canister cover 78. The cushion 120 is made of an elastically deformable material, preferably a silicone elastomer which has high temperature stability. The cushion 120 comprises a yieldable wall 122 which extends around the axis 40. The wall 122 defines a hollow frustoconical-shaped chamber 124 (FIG. 3) which extends axially through the cushion 120. Preferably, the wall 122 has a radial thickness of about 0.8–1.0 mm.

The wall 122 tapers radially along its axial extent. Specifically, the radial distance of the wall 122 from the axis 40 decreases along the axial extent of the wall 122 from a first or upper edge 126 to a second or lower edge 128. The first and second edges 126 and 128 of the wall 122 are at respective radial distances from the axis 40 which are approximately equal to the respective radial distances of the outermost and innermost radial peripheries of the disks 110. Accordingly, the wall 122 axially overlies the uppermost disk 110U.

First and second openings 130 and 132 (FIG. 3) are defined by the first and second edges 126 and 128 of the wall 122, respectively. The first opening 130 is larger than the second opening 132. These openings 130 and 132 expose the cushion chamber 124 to the surrounding exterior of the cushion 120. Prior to assembly of the cushion 120 in the inflator 10, the axial length of the wall 122 between the first and second edges 126 and 128 is greater than the distance D1 (FIG. 2) within the assembled inflator 10.

The wall 122 (FIG. 4) is in the shape of a frustum or truncated cone prior to assembly of the cushion 120 in the inflator 10. With respect to the rest of the inflator 10, the frustum-shape of the wall 122, when assembled in the inflator 10, is inverted (i.e., upside down). In the assembled inflator 10, the first edge 126 engages the wall portion 102. One section of the wall 122 extends, unbent, from the first edge 126 at the wall portion 102 toward the uppermost disk 110U. This section of the wall 122 continues to define the cushion chamber 124.

The wall 122 is elastically bent as indicated by reference number 134. The bend 134 in the wall 122 encircles the axis 40. The upper surface 112 of the uppermost disk 110U engages the wall 122 at the bend 134 in the wall 122. Accordingly, the axial end of the cushion chamber 124 is now at the bend 134 and the cushion chamber 124 has a reduced axial length.

Another section of the wall 122 extends within the cushion chamber 124, unbent and inverted (i.e., inside out), away from the uppermost disk 110U toward the wall portion 102. The bend 134 is located radially within the first unbent wall section and radially outside the other unbent wall section. The second edge 128 is located within the cushion chamber 124. The bend 134 in the wall 122 thus defines the axial end of the compressed cushion 120, and the axial length of the compressed cushion 120 is equal to the distance D1. The volume of cushion chamber 124 is reduced from its original size.

The cushion 120 has a resiliency which biases the cushion to return to its original, non-compressed shape. Specifically, the material of the wall 122 at the bend 134 is stressed and exerts a force which biases the wall toward a totally non-bent condition. Accordingly, the cushion 120 pushes against the cover 78 and the uppermost disk 110U and inhibits movement of the disks 110 relative to the canister 74. This inhibiting force provided by the cushion 120 is preferably about 1–2 pounds.

An annular prefilter 140 is disposed in the canister 74. The prefilter 140 is located radially outward of the disks 110 and inside the outer side wall 80 of the canister 74. A small annular space exists between the prefilter 140 and the outer side wall 80. The outer rim 104 engages the top of the prefilter 140.

An annular slag screen 142 (schematically illustrated) is located in the diffuser cup 32, outside of the combustion cup 34. The slag screen 142 is radially outward of the openings 56 and lies adjacent the combustion cup side wall 50.

An annular final filter assembly 144 is located inside the diffuser cup 32 above the slag screen 142. The final filter assembly 144 is radially inward of the gas outlet openings 46 in the side wall 38 of the diffuser cup 32. The final filter assembly 144 is a plurality of layers of various materials of suitable construction. The layers extend around the diffuser cup side wall 38 and are located inside the side wall 38. An annular filter shield 145 projects radially inward from the diffuser cup side wall 38 and separates the final filter assembly 144 and the slag screen 142. The filter shield 145 is secured to the diffuser cup side wall 38 by an interference fit.

The inflator 10 includes an initiator assembly 146. The initiator assembly 146 includes the igniter 88 which projects through the opening 68 in the chamber cover 36 into the central recess 94 of the canister 74. The initiator assembly 146 also includes a mounting portion with an annular flange that is welded with a continuous weld, preferably a laser weld, to the center portion 64 of the chamber cover 36 at a circumferential weld location 148.

During assembly of the inflator 10, the canister 74 with the attached packet 98, the prefilter 140, the disks 110, and the cushion 120 are first or separately assembled as a preassembled package. The prefilter 140 (FIG. 3) and the disks 110 are moved axially down into the lower canister section 76. The cushion 120 is overlaid on top of the uppermost disk 110U with the second edge 128 resting on the upper surface 112 of the uppermost disk 110U.

The canister cover 78, with the attached packet 98, is moved axially down. The wall portion 102 of the canister cover 78 pushes on the first edge 126 of the wall 122 and the upper surface 112 of the upper most disk 110U pushes on the second edge 128 to cause the segment of the wall 122 adjacent to the second edge 128 to bend into the cushion chamber 124. As the canister cover 78 is moved down toward engagement with the upper edge of the lower canister section 76, compression of the cushion 120 occurs under force from the canister cover 78 and the uppermost disk 110U. The location 134 at which the wall 122 is bent advances along the wall 122 from the second edge 128. Specifically, the annular segment of the wall 122 immediately, radially outward of the annular bend 134 is rolled into and becomes the location of the bend 134. Simultaneously, the segment of the wall 122 at the bend 134 is unrolled from being bent. The sections of the wall 122 away from the bend 134 remain unbent, albeit one section is inverted, through a large range of compression of the cushion 120. Thus, only one bend 134 is present in the wall 122 throughout this range of compression of the cushion 120.

Figure 2:
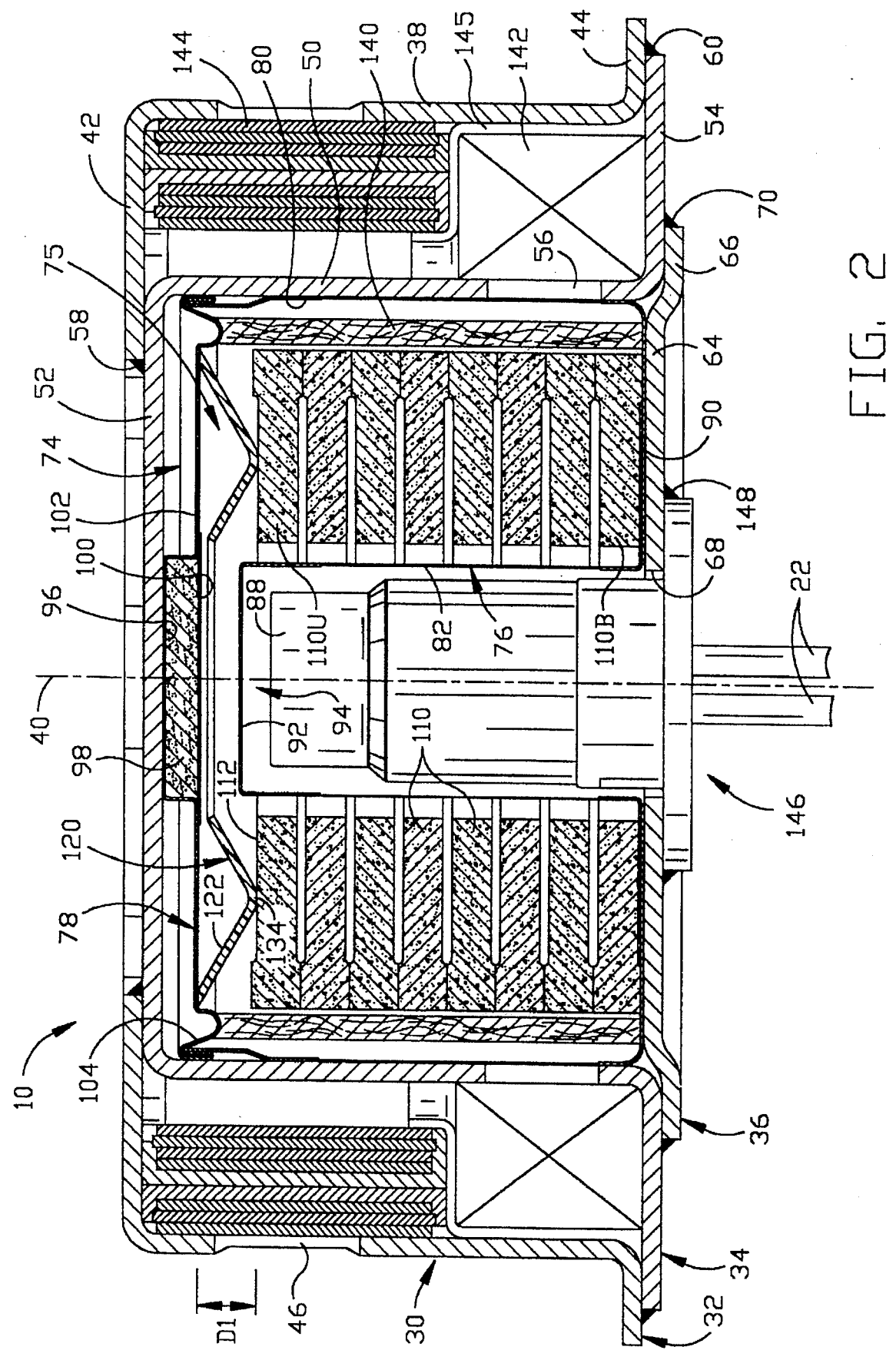
FIG. 2 is a transverse view, partially in section, of the inflator illustrated in FIG. 1.

When the canister cover 78 engages the upper edge of the lower canister section 76, the wall 122 has been rolled in a sufficient amount such that the overall axial height of the cushion 120 is equal to the space between the wall portion 102 of the canister cover 78 and the upper surface 112 of the uppermost disk 110U, i.e., the distance D1 (FIG. 2). The outer rim 104 engages the prefilter 140. The outer edge of the canister cover 78 is crimped to the upper edge of the lower canister section 76 to seal the canister 74. The cushion 120 inhibits movement of the disks 110 within the canister 74.

The inhibiting force provided by the cushion 120 is substantially constant throughout the range of compression of the cushion 120. Also, throughout the range of compression of the cushion 120, the wall 122 has one bend 134. The single bend 134 occurs because of the rolling and unrolling action of the wall 122 during compression. Since the wall 122 has one bend 134, only a single annular segment of the wall 122 is stressed at a time, and the force for stressing the wall is substantially constant. Also, the pressure from the cushion 120 is substantially unrelated to the distance D1.

Undue stress is not applied to the disks 110 by the compressed cushion 120 because the force provided by the cushion is substantially constant. Tolerances which are present during assembly and which effect the distance D1 are taken up by the cushion 120 via variation in the amount of compression of the cushion 120 without significant variation in the amount of pressure on the disks 110. Also, changes in the distance D1 between the wall portion 102 of the canister cover 78 and the upper surface 112 of the uppermost disk 110U due to thermal expansion/contraction of the canister 74 do not cause a significant variation of the pressure on the disks 110 for the same reason.

Further assembly of the inflator 10 occurs in a series of steps which may, but need not, proceed in the following order. The final filter assembly 144, the filter shield 145 and the slag screen 142 are moved axially into the diffuser cup 32. The combustion cup 34 is moved axially into the diffuser cup 32 and welded at the locations 58 and 60. The initiator assembly 146 is moved axially into the opening 68 of the chamber cover 36 and welded at the location 148. The preassembled canister 74 is moved axially into the combustion cup 34. The igniter 88 of the initiator assembly 146 is moved axially into the central recess 94, and the attached chamber cover 36 is located on the combustion cup 34 and welded at the location 70.

Upon the occurrence of a collision, the switch 20 (FIG. 1) closes, and an electrical energy signal flows through the leads 22 to the igniter 88 (FIG. 2) and ignites the igniter 88. Ignition of the igniter 88 forms hot gas products which flow outward from the igniter 88 and rupture the inner side wall 82 and the inner top wall 92 of the canister 74. The hot gas from the igniter 88 ignites the disks 110 of gas generating material. The disks 110 rapidly produce a large volume of gas.

The gas generated by combustion of the disks 110 flows radially outward through the prefilter 140. The prefilter 140 removes from the flowing gas some coarse particulates and other combustion products of the initiator assembly 146 and of the disks 110. The prefilter 140 also cools the gas, and molten combustion products plate on the prefilter.

The gas pressure acts on the outer side wall 80 of the canister 74, forcing the outer side wall 80 radially outward against the combustion cup side wall 50. This results in the thin portion of the outer side wall 80 being ruptured or blown out at the openings 56 in the combustion cup side wall 50. The reduced thickness of the outer side wall 80 adjacent the openings 56 allows this portion of the outer side wall 80 to rupture in preference to other portions at a desired pressure. The gas flows through the openings 56 and into the slag screen 142.

The slag screen 142 removes and traps particles from the flowing gas. The slag screen 142 also cools the flowing gas. When the gas cools, molten combustion products such as metal are plated onto the slag screen 142. The filter shield 145 causes turbulent flow of gas to occur in and around the slag screen 142. The turbulent gas flow promotes the retention of relatively heavy particles in the slag screen 142 and in the lower portion of the diffuser cup 32.

The gas flows axially upward from the slag screen 142 to the final filter assembly 144. The gas then flows radially outward through the final filter assembly 144 which removes small particles from the gas. The final filter assembly 144 also further cools the gas so that molten products in the gas may deposit on parts of the final filter assembly 144. The annular array of gas outlet openings 46 directs the flow of gas into the air bag 12 (FIG. 1) to inflate the air bag 12.

FIG. 5 illustrates an inflator 160 comprising a second embodiment of the present invention. The inflator 160 is located with a reaction canister 162 mounted within a dashboard or instrument panel (not shown) on the passenger side of a vehicle. An air bag 164 is folded adjacent to the inflator 160. Movable doors 166 cover the reaction canister 162 and the enclosed inflator 160 and air bag 164 from the vehicle passenger compartment.

A sensor 168 (schematically shown) detects a condition indicative of a collision. Such a condition may be a sudden change in vehicle velocity, e.g., a sudden deceleration of the vehicle during the collision. The sensor 168 includes a switch 170 that closes in response to the detected condition so that an electrical energy signal flows along leads 174 between a power source 172 (e.g., the vehicle battery) and the inflator 160. The inflator 160 supplies gas to the air bag 164 to inflate the air bag 164. The doors 166 move upon inflation of the air bag 164. As the air bag 164 inflates, it moves into the space between the passenger and the dash panel to restrain movement of the passenger in a suitable manner.

The inflator 160 (FIG. 6) includes a metal housing 176. The housing 176 includes a tubular cylindrical wall 178 (FIG. 7) having a cylindrical inner surface 180 defining a chamber 182 which is substantially enclosed by the housing 176. An end wall 184 (FIG. 6) of the housing 176 closes one end of the chamber 182. A threaded mounting stud 186 projects axially from the end wall 184 in a direction away from the chamber 182.

An elongated, annular filter 192 is disposed in the chamber 182 adjacent the inner surface 180 of the housing wall 178 of the housing 176. An annular inner filter seal 194 is disposed between the filter 192 and the housing end wall 184. A spacer 200 is disposed in the chamber 182 and abuts the end wall 184. The spacer 200 is disposed radially inward of the inner filter seal 194 and the filter 192. A body of auto ignition material 202 is located in the spacer 200, on a longitudinal central axis 204 of the inflator 160.

The chamber 182 has an opening 188 (FIG. 8) at the end of the inflator 160 opposite the end wall 184. The housing wall 178 has an internal thread 190 at the opening 188. An annular outer filter seal 196 engages an axially outer end surface 198 of the filter 192 adjacent the opening 188 of the chamber 182.

Gas generating material 210 (FIG. 6) is disposed in the chamber 182 in the housing 176, radially inside the filter 192. Similar to the first embodiment, the gas generating material generates nitrogen gas and is a suitable type. The gas generating material 210 includes a plurality of grains of gas generating material arranged in two groups 212 and 216. The grains 212 in the first group have relatively small diameter central openings 214 extending axially through the grains 212. The second group of grains 216 includes two grains with relatively large diameter central openings 218. The axially rightmost (toward the right, as viewed in the figures) grain 216R is adjacent the opening 188 and has an axially outer end surface 222 (FIG. 7) facing in the direction of the opening 188.

An end cap 226 closes the opening 188 and defines an end wall of an enclosure of the chamber 182. The end cap 226 has a main body portion 228 and an outer flange 230. An annular seal 232 seals between the outer flange 230 and an end flange 234 of the housing wall 178. An outer thread 236 of the end cap 226 engages the internal thread 190 of the housing 176. A thread sealant (not shown) seals between the threads 190 and 236.

The end cap 226 has an axially outer end surface 238 and an axially inner end surface 240. A barrel portion 242 of the end cap 226 projects axially inward from the surface 240. An igniter 244 (schematically shown) is secured in the barrel portion 242 of the end cap 226. The igniter 244 is of construction suitable to ignite the gas generating material 210. The leads 174 extend outward from the igniter 244 through the end cap 226.

A space of axial distance D2 is located between the surface 222 of the rightmost grain 216R and the end surface 240 of the end cap 226. An annular cushion 260 is disposed within the chamber 182 in the space between the surface 222 and the end surface 240. The cushion 260 is made of an elastically deformable material, preferably a silicone elastomer which has high temperature stability. The cushion 260 comprises a yieldable wall 262 which extends around the axis 204. The wall 262 (FIG. 8) defines a hollow frustoconical-shaped chamber 264 which extends through the cushion 260.

The wall 262 tapers radially along its axial extent. Specifically, the radial distance of the wall 262 from the axis 204 decreases along the axial extent of the wall 262 from a first or left edge 266 to a second or right edge 268. The first and second edges 266 and 268 of the wall 262 are at respective radial distances from the axis 204 which are approximately equal to the respective radial distances of the outermost and innermost radial peripheries of the grains 216. Accordingly, the wall 262 axially overlies the rightmost grain 216R.

First and second openings 270 and 272 are defined by the first and second edges 266 and 268 of the wall 262, respectively. The first opening 270 is larger than the second opening 272. These openings 270 and 272 expose the cushion chamber 264 to the surrounding exterior of the cushion 260. Prior to assembly of the cushion 260 in the inflator 160, the axial length of the wall 262 between the first and second edges 266 and 268 is greater than the distance D2 (FIG. 7).

The wall 262 (FIG. 9) is in the shape of a frustum or truncated cone prior to assembly of the cushion 260 in the inflator 160. With respect to the inflator 160 in a typical mounted orientation in a vehicle, the frustum-shape is on its side (FIG. 8). In the assembled inflator 160 (FIG. 7), the first edge 266 engages the surface 222 of the rightmost grain 216R. One section of the wall 262 extends, unbent, from the surface 222 of the rightmost grain 216R toward the end surface 240 of the end cap 226. This section of the wall 262 continues to define the cushion chamber 264.

The wall 262 is elastically bent as indicated by reference number 274. The bend 274 in the wall 262 encircles the axis 204. The end surface 240 of the end cap 226 is engaged with the wall 262 at the bend 274 in the wall 262. Accordingly, the axial end of the cushion chamber 264 is now at the bend 274 and the cushion chamber 264 has a reduced axial length.

Another section of the wall 262 extends within the cushion chamber 264, unbent and inverted (i.e., inside out), away from the end cap 226. The bend 274 is located radially within the first unbent wall section and radially outside the other unbent wall section. The second edge 268 is located within the cushion chamber 264. The bend 274 in the wall 262 thus defines the axial end of the cushion 260, and the axial length of the cushion 260 is equal to the distance D2 (FIG. 7). The volume of the cushion chamber 264 is reduced from its original size.

The cushion 260 has a resiliency which biases the cushion to return to its original, non-compressed shape. Accordingly, the cushion 260 pushes against the end cap 226 and the rightmost grain 216R and inhibits movement of the gas generating material 210 relative to the housing 176. This inhibiting force provided by the cushion 260 is preferably about 1-2 pounds.

The inflator 160 (FIG. 6) is assembled by first inserting the spacer 200 and the inner filter seal 194 into the housing 176 in an axially inward direction (right to left, as viewed in FIG. 6). Next, the filter 192 and the gas generating material 210 are inserted into the housing 176. The outer filter seal 196 is then positioned in the housing 176, engaging the outer end surface 198 of the filter 192.

The cushion 260, in its original non-compressed shape, is inserted axially through the opening 188 into the chamber 182 in the housing 176. The cushion 260 axially overlies the rightmost grain 216R and the first edge 266 contacts the surface 222. The end cap 226 is screwed into opening 188 and into contact with the second edge 268 of the cushion 260. The end surface 240 pushes on the second edge 268 and the surface 222 pushes on the first edge 266 to cause the segment of the wall 262 adjacent to the second edge 268 to bend into the cushion chamber 264.

As the end cap 226 is further screwed into the opening 188, compression of the cushion 260 occurs under force from the end cap 226 and the rightmost grain 216R. The location 274 at which the wall 262 is bent advances along the wall 262 from the second edge 268. Specifically, the segment of the wall 262 immediately radially outward of the bend 274 is rolled into and becomes the location of the bend 274. Simultaneously, the segment of the wall 262 at the bend 274 is unrolled from being bent. The sections of the wall 262 away from the bend 274 remain unbent, albeit one section is inverted, through a large range of compression of the cushion 260. Thus, only one bend 274 is present in the wall 262 throughout this range of compression of the cushion 260.

When the end cap 226 is fully screwed into the housing 176, the wall 262 has been rolled in a sufficient amount such that its overall axial length is equal to the space between the surface 222 of the rightmost grain 216R and the surface 240 of the end cap 226, i.e., the distance D2 (FIG. 7). The inhibiting force provided by the cushion 260 is substantially constant throughout the range of compression of the cushion. Also, throughout the range of compression of the cushion 260, the wall 262 has one bend 274. The single bend 274 occurs because of the rolling and unrolling action of the wall 262 during compression.

Since the wall 262 has one bend 274, only a single annular segment of the wall 262 is stressed at a time, and the force for stressing the wall is substantially constant. Also, the pressure from the cushion 260 is substantially unrelated to the distance D2. Undue stress is not applied to the grains 212 and 216 by the compressed cushion 260 because the force provided by the cushion is substantially constant.

Tolerances which are present during assembly are taken up by the cushion 260 via variation in the amount of compression of the cushion 260 without significant variation in the amount of pressure on the grains 212 and 216. Also, changes in the distance D2 between the surface 222 and the end surface 240 due to thermal expansion/contraction of the housing 176 do not cause a significant variation of the pressure on the grains 212 and 216.

As an example, FIG. 10 illustrates an inflator 160 which has a space of axial distance D2', which is less than the distance D2 (FIG. 7). As shown in FIG. 10, the surface 222 of the rightmost grain 216R is relatively near to the end surface 240 of the end cap 226. The wall 262 of the cushion 260 is rolled into the cushion chamber 264 a greater amount than as shown in FIG. 7. The resilient pressing force of the cushion 260, which has been compressed to the distance D2' (FIG. 10), is substantially the same as the resilient pressing force of the cushion 260, which has been compressed to the distance D2 (FIG. 7).

After assembly, a major portion of the end cap 226 is disposed within the chamber 182 in the housing 176. The barrel portion 242 of the end cap 226 extends into the opening 218 of the rightmost grain 216R. The assembled inflator 160 is mounted in the reaction canister 162 in conjunction with the air bag 164.

Upon the occurrence of a collision, the switch 170 (FIG. 5) closes and an electrical energy signal flows to actuate the igniter 244 (FIG. 6). The igniter 244 ignites the gas generating material 210. The gas generating material 210 rapidly produces a large quantity of gas for inflating the air bag 164. The gas flows radially outward through the filter 192 and through openings 280 in the housing wall 178, and thence into the air bag 164 to inflate the air bag, in a known manner.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for providing inflation fluid for inflating an inflatable vehicle occupant restraint, said apparatus comprising:

gas generating material;

an enclosure having an end wall portion defining an enclosure chamber;

said gas generating material being within said enclosure chamber and spaced a distance from said end wall portion; and yieldable means located adjacent to said end wall portion and said gas generating material, said yieldable means providing a force acting on said gas generating material and on said end wall portion to inhibit movement of said gas generating material relative to said enclosure and relative to said end wall portion, said force being constant and unrelated to the distance between said gas generating material and said end wall portion.

2. An apparatus as set forth in claim 1, wherein said yieldable means comprises a member having a frustoconical-shaped chamber defined by a wall of said member, said wall encircling an axis of said member and being elastically bent into said chamber in said member.

3. An apparatus as set forth in claim 2, wherein said wall engages said gas generating material at a location at which said wall is bent into said chamber in said member.

4. An apparatus as set forth in claim 2, wherein said wall engages said end wall portion of said enclosure at a location at which said wall is bent into said chamber in said member.

5. An apparatus as set forth in claim 2, wherein said member is made of a silicone elastomer.

6. An apparatus as set forth in claim 1, wherein said yieldable means includes a member which has a wall, said wall having an initial frustum shape prior to location of said yieldable means within said enclosure.

7. An apparatus as set forth in claim 1, wherein said yieldable means includes a member which has a wall encircling an axis and defining a chamber in said member, said wall being partially rolled into said chamber in said member at one axial end of said member.

8. An apparatus as set forth in claim 1, wherein said yielding means acts on and contacts only said end wall portion and said gas generating means to provide said force.

9. Apparatus for providing inflation fluid for inflating an inflatable vehicle occupant restraint, said apparatus comprising:

gas generating material;

an enclosure having an end wall portion defining an enclosure chamber;

said gas generating material being within said enclosure chamber and spaced a distance from said end wall portion; and a member located in said chamber adjacent to said end wall portion and said gas generating material, said member providing a force acting on said gas generating material and on said end wall portion to inhibit movement of said gas generating material relative to said enclosure and relative to said end wall portion, said force being constant and unrelated to the distance between said gas generating material and said end wall portion, said member having a frustoconical-shaped chamber extending through said member, said chamber in said member being defined by a wall encircling an axis of said member, said wall tapering radially inward toward the axis along an extent of said wall, said wall being bent into said chamber in said member at one end of said chamber in said wall due to a force applied to said wall.

10. An apparatus as set forth in claim 9, wherein said wall engages said end wall portion of said enclosure at a location at which said wall is bent.

11. An apparatus as set forth in claim 9, wherein said wall engages said gas generating material at a location at which said wall is bent.

12. An apparatus as set forth in claim 9, wherein said member is made of a silicone elastomer.

13. Apparatus for providing inflation fluid for inflating an inflatable vehicle occupant restraint, said apparatus comprising:

gas generating material;

an enclosure having an end wall portion defining an enclosure chamber;

said gas generating material being within said enclosure chamber and spaced a distance from said end wall portion; and a member located within said enclosure chamber adjacent to said end wall portion and said gas generating material, said member providing a force acting on said gas generating material and on said end wall portion to inhibit movement of said gas generating material relative to said enclosure and relative to said end wall portion, said force being constant and unrelated to the distance between said end wall portion and said gas generating material, said member having an initial hollow frustum shape prior to location in said enclosure chamber, said member having a wall defining a chamber in said member and an open end exposing said chamber in said member to the exterior of said member, said wall having a non-bent section and a bent section due to a force applied to said wall.

14. An apparatus as set forth in claim 13, wherein said bent section of said wall engages said end wall portion of said enclosure.

15. An apparatus as set forth in claim 13, wherein said bent section of said wall engages said gas generating material.

16. An apparatus as set forth in claim 13, wherein said member is made of a silicone elastomer.

* * * * *